(12) United States Patent
Kinzler et al.

(10) Patent No.: US 8,181,978 B2
(45) Date of Patent: May 22, 2012

(54) BICYCLE SUSPENSION SYSTEM

(76) Inventors: Frederick W. Kinzler, Trumbull, CT (US); Walker P. Woodworth, Wilton, CT (US); Luigi J. Toffolo, Wilton, CT (US)

( * ) Notice: Subject to any disclaimer, the term of this patent is extended or adjusted under 35 U.S.C. 154(b) by 126 days.

(21) Appl. No.: 12/583,778

(22) Filed: Aug. 26, 2009

(65) Prior Publication Data

US 2011/0049833 A1    Mar. 3, 2011

(51) Int. Cl.
*B62K 21/08* (2006.01)
(52) U.S. Cl. .................. 280/276; 280/279; 280/277
(58) Field of Classification Search .................. 280/276, 280/279, 277
See application file for complete search history.

(56) References Cited

U.S. PATENT DOCUMENTS

| | | | | |
|---|---|---|---|---|
| 4,842,292 A * | 6/1989 | Wang | .............................. | 280/287 |
| 4,881,750 A * | 11/1989 | Hartmann | ...................... | 280/276 |
| 5,417,305 A * | 5/1995 | Parker | ........................... | 180/219 |
| 6,047,981 A * | 4/2000 | Burrows | ........................ | 280/276 |
| 6,536,550 B2 * | 3/2003 | Schmidt et al. | ............... | 180/209 |
| 6,619,683 B1 * | 9/2003 | Lin et al. | ........................ | 280/270 |
| 6,637,559 B2 * | 10/2003 | Hoose | ...................... | 188/322.16 |
| 6,715,577 B2 * | 4/2004 | Oteri | .............................. | 180/219 |
| 6,942,235 B2 * | 9/2005 | Chang | ........................... | 280/278 |
| 2003/0015854 A1 * | 1/2003 | Schmidt et al. | ............... | 280/279 |
| 2003/0123925 A1 * | 7/2003 | Kinzler et al. | ............. | 403/109.5 |
| 2004/0262879 A1 * | 12/2004 | Kinzler et al. | ................ | 280/276 |
| 2005/0082785 A1 * | 4/2005 | Mydlarz | ....................... | 280/276 |

* cited by examiner

*Primary Examiner* — Joanne Silbermann
*Assistant Examiner* — Marlon A Arce

(57) ABSTRACT

In a preferred embodiment, an ultra-light weight suspension fork for bicycles that provides smooth action of the suspension system that hitherto has been unachievable. This fork assembly contains a telescoping mechanism located in the head tube of the bicycle that uses linear roller bearings to reduce stiction and prevent torsional losses, but limits weight by only using two such bearings. Side-to-side load is eliminated by the use of two longitudinal members in close proximity to the inner tube of this telescoping mechanism. The telescoping mechanism is coupled to the wheel via an arched single-sided fork crown designed to maintain torsional and braking stiffness. The arched crown contains arches in two dimensions. The fork crown is coupled to the wheel via a shaped fork tube whose wall is thickened while the outside diameter is reduced so that the connection point to the axle mechanism has the same outside diameter as the fork tube thereby enabling significant strengthening of the assembly.

8 Claims, 9 Drawing Sheets

BICYCLE SUSPENSION SYSTEM

RELATED APPLICATIONS

Provisional Application No. 61/188,221 filed on Aug. 7, 2008.
U.S. Pat. No. 5,320,374 June 1994 Farris et al.
U.S. Pat. No. 5,494,302 February 1996 Farris et al.
U.S. Pat. No. 5,702,092 December 1997 Farris et al.
U.S. Pat. No. 5,924,714 July 1999 Farris et al.
U.S. Pat. No. 6,007,056 December 1999 Farris et al.
U.S. Pat. No. 6,155,541 December 2000 Farris et al.
U.S. Pat. No. 5,509,675 April 1996 Barnett
U.S. Pat. No. 5,195,766 March 1993 Dohrmann et al.
U.S. Pat. No. 4,971,344 November 1990 Turner
U.S. Pat. No. 4,609,202 September 1986 Miyakushi et al.

BACKGROUND OF THE INVENTION

1. Field of the Invention

The present invention relates to bicycle suspension systems and more particularly to a lightweight suspension fork assembly. This invention is an improvement on bicycle suspension systems that allows for a torsionally stiff suspension system that is very lightweight. The system addresses drawbacks of conventional designs.

2. Description of the Prior Art

Various suspension systems have been proposed and developed for bicycles. Many of these systems utilize a pair of telescoping assemblies between which the front wheel is mounted. Each assembly comprises an outer tube and an inner tube which is free to move in and out of the outer tube and is cushioned by a damper of one sort or another. The outer tubes are connected at the lower ends to the bicycle axle of the front wheel and the upper ends of the inner tube are connected together in a fashion similar to the usual upper end of a bicycle fork.

As is known to those skilled in the art, these types of suspension systems use anti-friction bushings to allow free movement of the inner tube within the outer tube. These bushings have undesirable static friction called "stiction." Because of this, the suspension systems using such bushings tend to stick and release. In addition, the two telescoping assemblies also have to be fixed together in some manner as through a "U" shaped yoke at the upper ends of the tubes to eliminate twisting. Even with this "U" shaped yoke the torsional stiffness of these types of assemblies is still limited.

In addition the use of two sets of telescoping fork tubes and a steerer tube add considerable weight to the suspension system. Most of these suspension systems utilize damping mechanisms housed in each fork tube to provide compression and rebound damping. The fork tubes are filled with oil which adds considerable weight.

A prior art example of a system which overcomes stiction is shown in Farris et al. U.S. Pat. No. 5,320,374 and subsequent applications. In this example a different form of suspension system is described using an outer tube which is adapted to be mounted in and extend through the head tube of the bicycle frame and an inner tube connected to the fork of the bicycle which telescopes within the outer tube. The inner surface of the outer tube and the outer surface of the inner tube each have a plurality (at least three) of axially arranged opposing longitudinal flat sections such as four on each tube. A plurality of hardened steel inner race shims are positioned longitudinally on the flats of the inner tube. A plurality of hardened steel outer race shims are positioned longitudinally on the flats of the outer tube. A plurality of needle bearings are disposed between the tubes in between the respective inner and outer race shims. This arrangement allows the two tubes to freely telescope in and out with respect to one another without any significant static friction and also serves to transmit the torsional steering force from the outer tube to the inner tube. This particular system is used extensively today because it can bear a combination of loads comprising very high radial loads and at the same time provide stable and tight rotational motion in steering of the front wheel through the suspension system from the handlebars. This type of system also allows a simple U shaped fork to be used and incorporates a damper in the telescoping mechanism located in the steerer tube. In terms of weight, this design eliminates the multiple fork tubes, incorporates less oil and thus is inherently lighter weight than the previously discussed suspension systems.

In terms of weight savings, this design is still not ideal. The telescoping system described incorporates 6 to 8 steel races and 3 to 4 sets of bearings. Secondly, the highly stressed inner tube must be formed of a material and in a manner such that it bends rather than breaks. High strength steel is commonly used for the inner tube for this purpose, but it is heavy and counter to the consumer's preference. Lighter materials such as Aluminum in combination with strengthening processes such as shot-peening to strengthen the outer skin have been used as a material for the inner tube. Here-to-for, unfortunately, telescope assemblies whose inner tube connects to the fork crown with greater than 70 mm length of travel have been unable to pass stress testing using the present art as described in the aforementioned patents despite the additional costly process of shot-peening and use of expensive high-strength aluminum alloys. Kinzler et al. outlines methods to achieve a longer travel design through unique geometry and larger tube sizes. Regardless, this telescoping set of tubes weighs 450 g even using an inner tube of aluminum. One of steel would be even heavier.

Another prior art suspension system describes embodiments that can be characterized as a single-sided suspension system (U.S. Pat. No. 6,145,862). This type of system eliminates the weight of one side of the fork and allow for longer travel of the suspension. However, the system described uses 2 sets of clamps, a steerer tube piece to connect the clamps to the frame of the bicycle and a telescoping system coupled to a bent tube that clamps to the wheel of the bicycle. This design is heavier than required because of the clamps, additional tubing required in the steerer tube, the extended telescoping assembly and the bent tubing assembly attached to the wheel. In addition, this design utilizes the standard 3 or 4 flat system that incorporates pre-loaded bearings to reduce stiction; each set of flats utilized adds weight.

To achieve a light weight system, it would be ideal to incorporate the benefits of a needle bearing system with a design that utilizes a one-leg system. The design should have low stiction, but allowed good rotational control with the appropriate stiffness needed for a suspension fork.

SUMMARY OF THE INVENTION

In its preferred embodiment, the suspension system is comprised of two tubes one fitting inside the other designed to telescope within the other. These tubes are mounted into the head tube or steering tube of the bicycle and include a damping system. Of note are only two sets of axially extending flat sections on each tube along with sets of bearings that are disposed between these flat sections. In addition two longitudinal non-preloaded members are predisposed in the outer tube to allow free linear motion, but no side-to-side motion of the tube relative to each other. Attached to the inner tube is a double-arched crown member designed to reduce torsional loads and increase stiffness specially designed to transmit forces through a single tube to the fork, thus eliminating heavy suspension assembly components.

It is a principal object of the present invention to provide an improved suspension fork that is by far lighter weight and lower cost then the current available systems.

It is yet another object of the invention to eliminate clamps to connect to the frame of the bicycle.

It is yet another object of the invention to provide a telescoping assembly with at least 80 mm of travel.

DETAILED DESCRIPTION OF THE INVENTION

Figure 1:
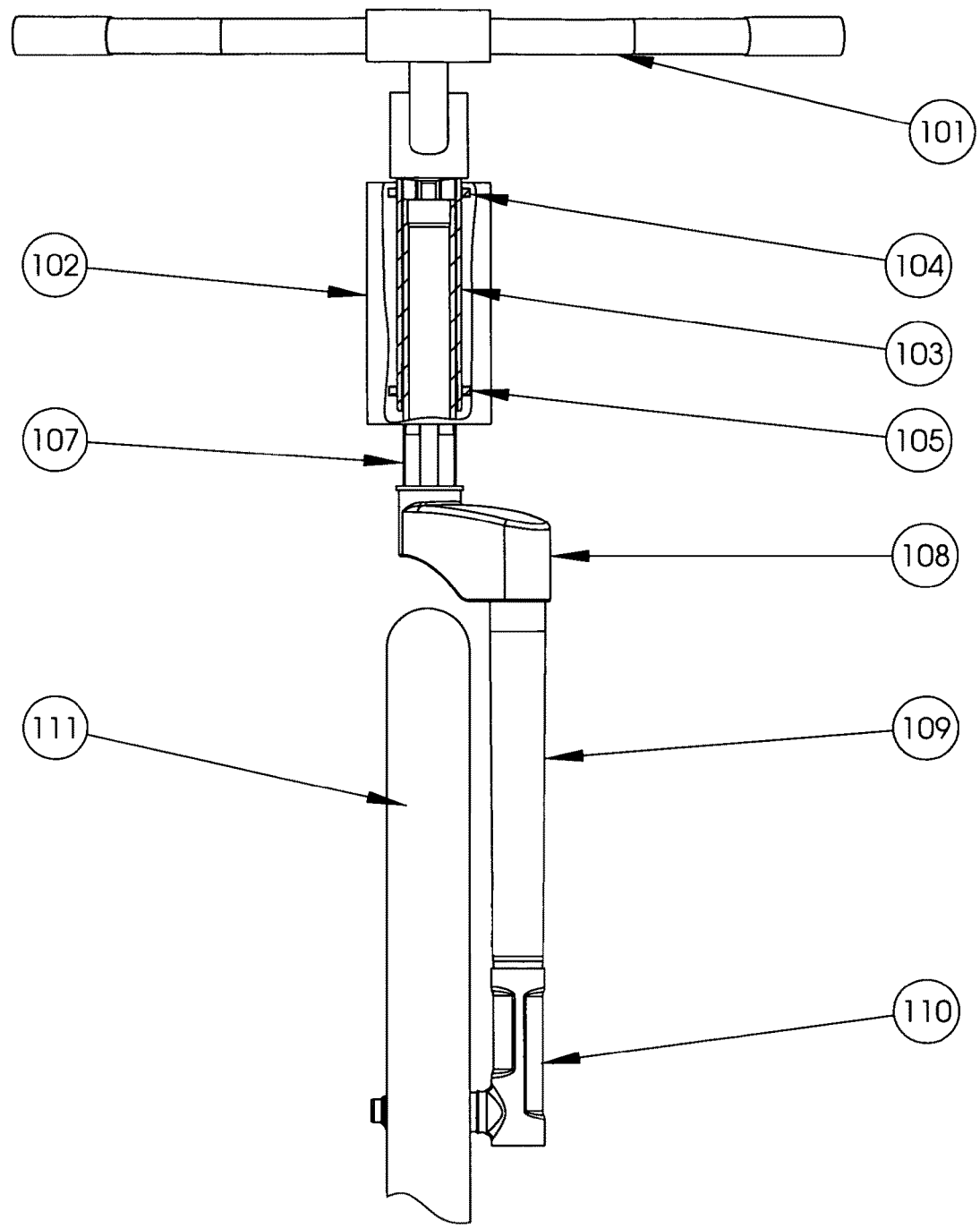
FIG. 1 shows a simplified view illustrating the preferred form of the bicycle suspension system

FIG. 1 shows a front view of a front bicycle suspension system. Handlebars 101 are coupled to an outer tube 103 housed within a head tube 102 (partially shown). The outer tube 103 of the telescoping assembly is pressed into the head tube 102 using upper and lower journal bearings 104-105 to allow for steering rotation. Housed within outer tube 103 is an inner tube 107. Inner tube 107 telescopes within outer tube 103. Coupled to inner tube 107 is a fork crown 108 which is positioned forward to create the trail of the bicycle. Fork tube 109 is a tapered butted tube which is attached to fork crown 108 and a dropout tube 110. Dropout tube 110 contains a small hub stem (not shown) that rides inside the hub (not shown) of wheel 111. As the wheel 111 encounters a bump, the force is translated to inner tube 107. A damper housed in inner tube 107 (not shown in this view), dampens the shock of the bump by allowing inner tube 107 to translate within outer tube 103.

Figure 2A:
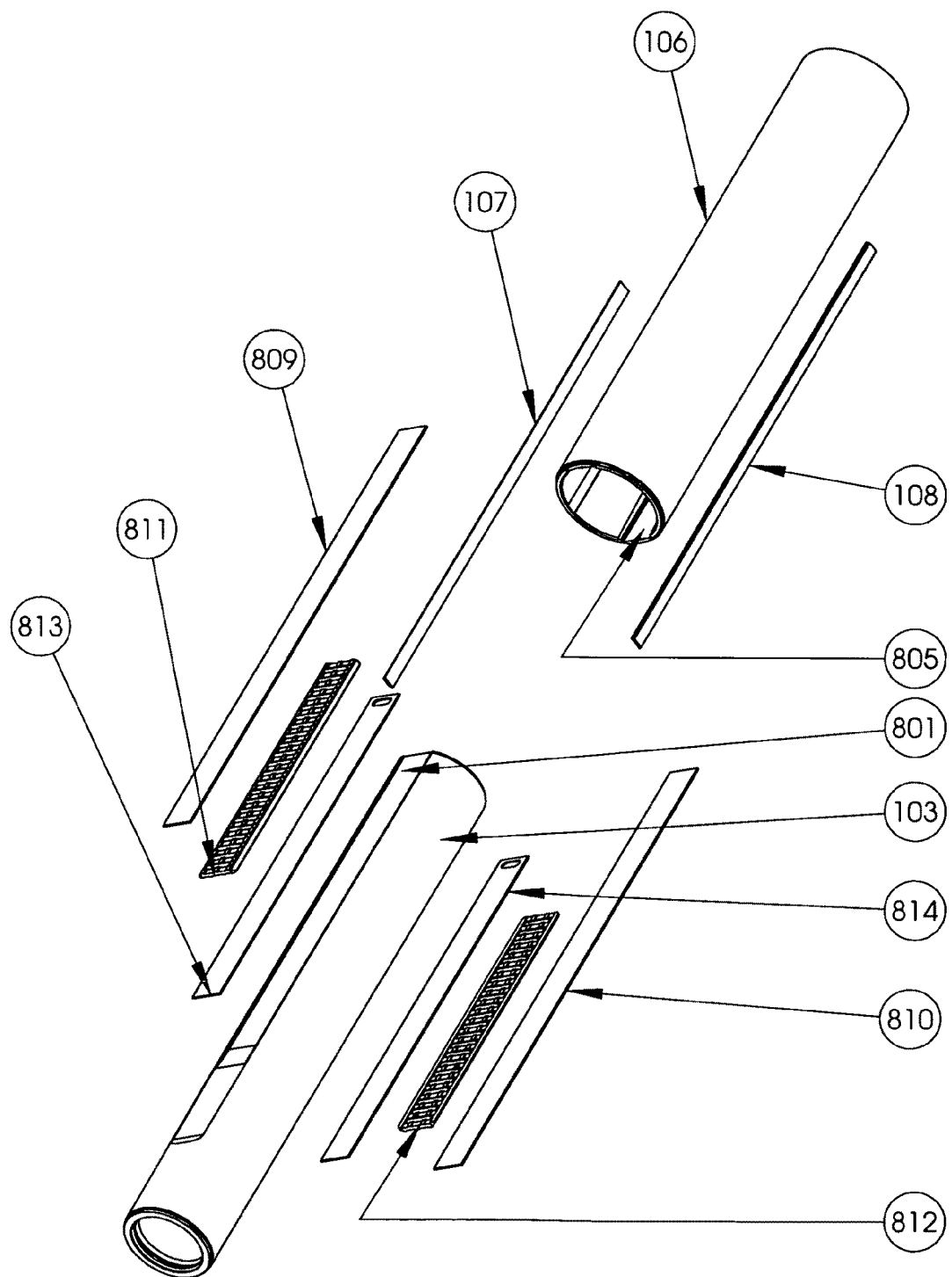
FIG. 2A shows an exploded view of the telescoping mechanism illustrating outer and inner tubes and assembly components

FIG. 2A is an exploded view of the telescoping assembly showing parts germane to this invention. The outer wall of the inner tube 103 depicts a plurality of axially extending longitudinal flat surfaces or flats of which one is shown 801. In the preferred embodiment there are two such flats opposed to each other, however there can be one or more flats used. In the inner wall of the outer tube 106, there are axially extending flats of which one is shown 805 that are opposing the corresponding flats on the inner tube. Contained between the inner and outer tube sets of flats are sets of outer races 809-810, bearing needle assemblies 811-812 and inner races 813-814. The inner and outer races are commonly made of hardened carbon steel or stainless steel. There are a corresponding number of sets of bearing needle assemblies with the number of flats on the outer tube and inner tube. In the preferred embodiment there are 2 sets of bearing assemblies that are predisposed opposite of each other. Housed in the inner wall of the outer tube 106 is a plurality of low friction longitudinal members 107-108. In the preferred embodiment there are two such members. The members are manufactured so as to provide clearance relative to the inner tube 103. Such clearance is typically on the order of 0.0005". The members are designed to act as bumpers to prevent side movement should it occur, but not have the weight of additional bearing assemblies. The corresponding face of the inner tube 103 that faces each longitudinal member 107-108 has a modified surface structure so as to reduce the frictional force. The surface microstructure has been modified so as to provide a smooth surface limiting the coefficient of friction between the longitudinal members 107-108 and the inner tube 103 should they contact each other.

Figure 2B:
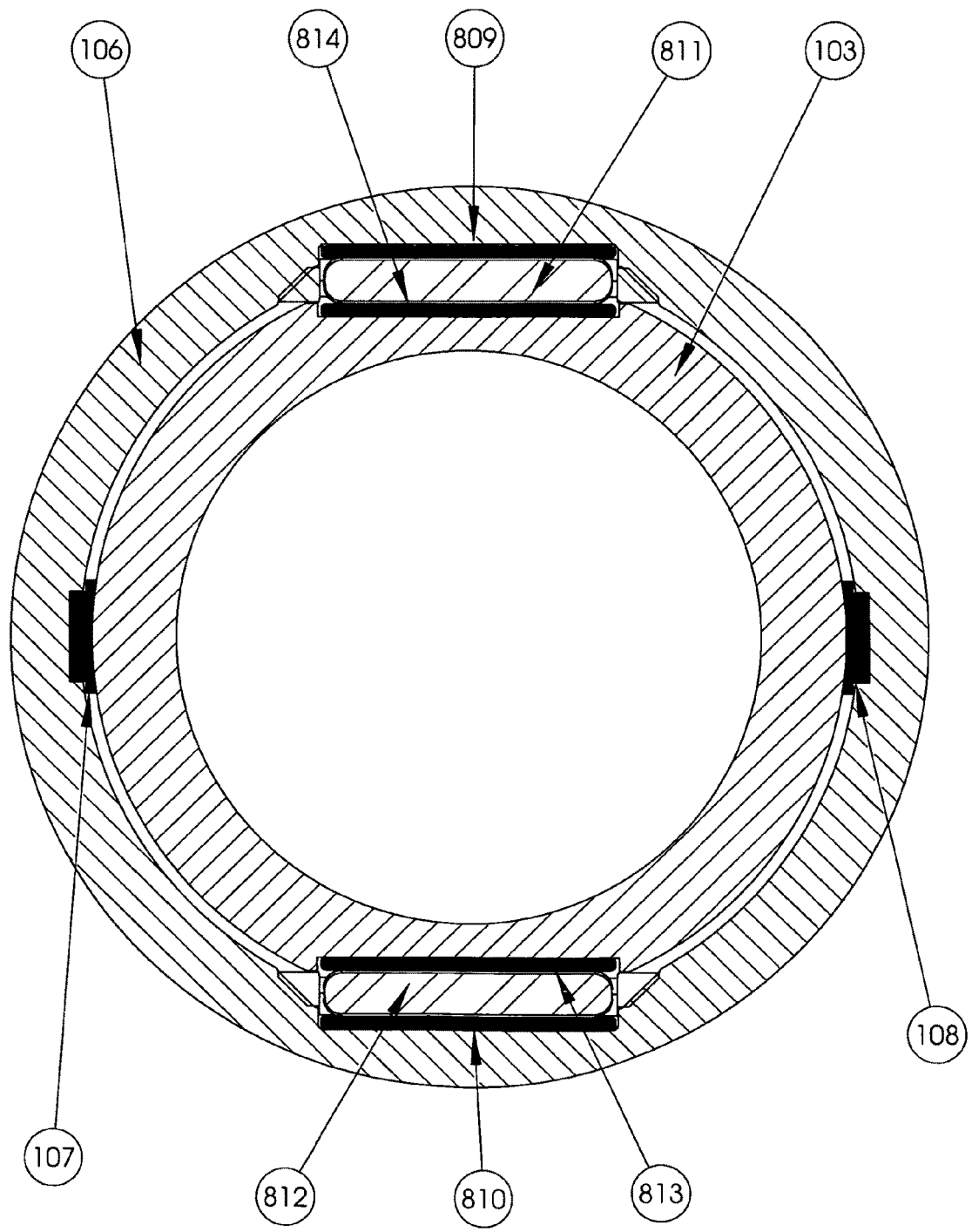
FIG. 2B shows a cross sectional view illustrating the relation of the outer and inner tubes of the mechanism.

FIG. 2B shows a cross-sectional view of the preferred embodiment of the telescope highlighting the relationship of the inner tube 103, the outer tube 106, the inner races 813-814, the outer races 809-810 and the needle bearing assemblies 811-812 and longitudinal members 107-108.

The needle bearing assemblies 811-812 allow the inner tube 103 to travel freely in an axial direction with respect to the outer tube 106. Additionally, the needle bearing assemblies 811-812 in conjunction with the inner races 813-814, outer races 809-810 which are imbedded in their respective flats, and outer tube 106 create rotational rigidity in that forces acting to rotate the seat are imparted on the needle bearing assemblies 811-812 which prevent such rotation.

Figure 3:
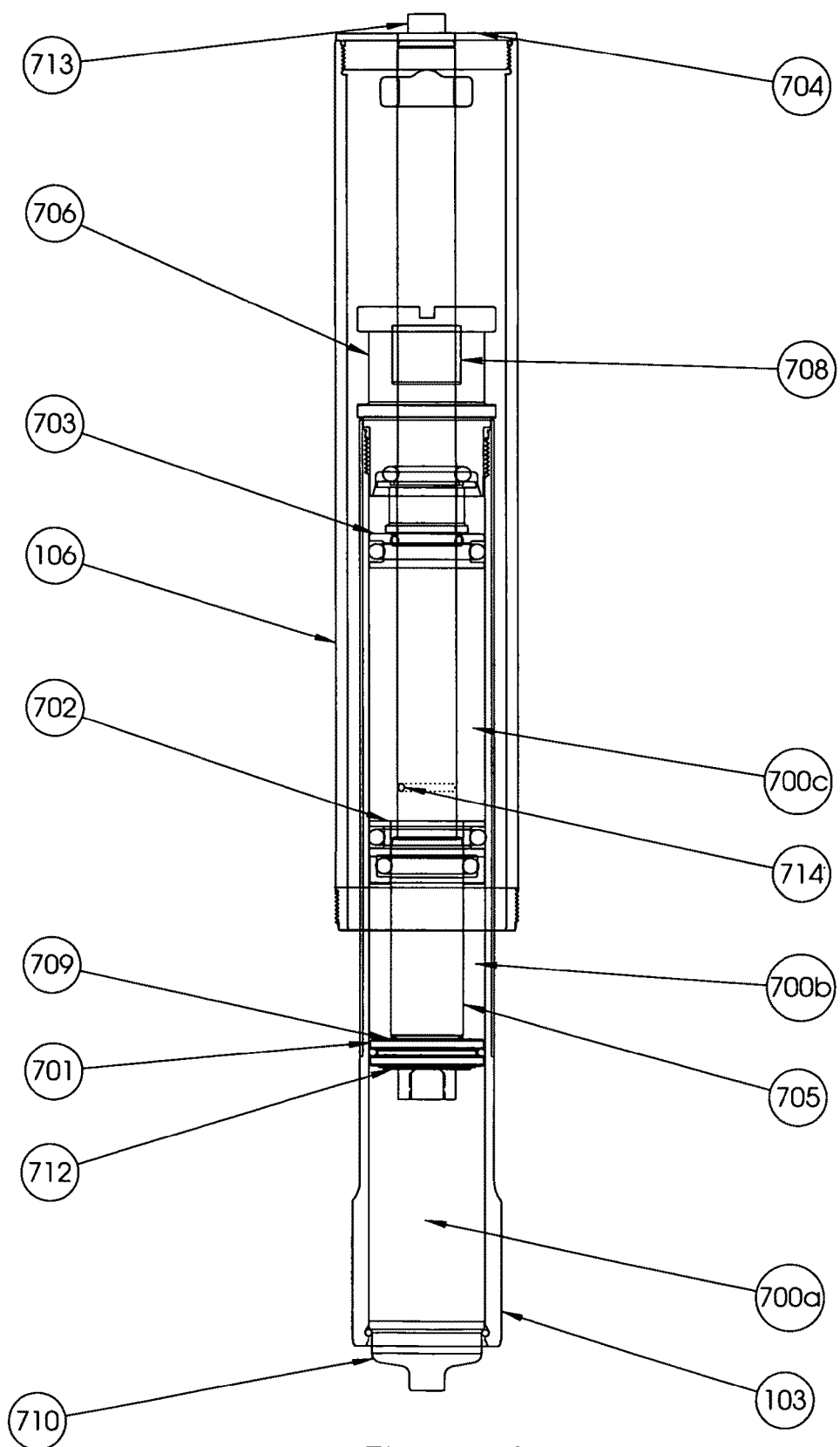
FIG. 3 shows a cross-sectional view illustrating the damping mechanism interior relative to the inner and outer tubes.

FIG. 3 shows a cross-sectional view of the damping mechanism housed in the telescoping mechanism. Inner tube 103 is separated into 3 chambers: two oil chambers 700a and 700b created by an oil piston 701, a floating piston 702, and an inner tube cap 710 and one air chamber 700c created between floating piston 702 and air piston 703. Attached to outer tube 106 is an outer tube cap 704 to which is attached a main shaft 705. Main shaft 705 extends into the inner tube 103 through a damper cap 706, through floating piston 702 and is attached to oil piston 701. Guide bushing 708 helps to ensure that the main shaft 705, inner table 103 and outer tube 106 remain concentric to each other during operation and takes up any side loading that may occur. As the inner tube 103 moves relative to outer tube 106, the oil piston 701 moves in a reverse direction relative to inner tube 103. Compression shims 709 initially prevent oil movement in between chambers 700a and 700b. As the force increases, oil is allowed to move from chamber 700a into 700b and oil piston 701 moves down. Likewise when the inner tube 103 rebounds relative to outer tube 106, the oil piston 701 allows oil movement back from 700b into 700a through slots (not shown) in the oil piston 701 and under and around rebound shims 712. During compression, main shaft 705 moves into the oil chamber 700b displacing oil. This oil forces floating piston 702 towards air piston 703. Likewise, during rebound, the reverse happens and floating piston 702 moves towards oil piston 701. A return "air spring" is created inside air chamber 700c. Air is introduced into the main shaft 705 via a Schrader fitting 713 and through the inner diameter of main shaft 705 and out a hole in main shaft 705 located at position 714 on the main shaft 705. During compression air piston 703 moves closer to floating piston 702 creating rebound force. As the compression force abates, the force created by the pressure between floating piston 702 and air piston 703 forces the inner tube 103 back away from the outer tube 106. The movement of floating piston 702 serves to accelerate the shrinkage of air chamber 700c during compression. As this happens the air pressure in 700c builds progressively and the force preventing further compression increases progressively as a result. The floating piston 702 then responds to the expansion or contraction of oil volume located between the oil piston 701 and floating piston 702. The movement of the floating piston 702 towards the air piston 703 creates a higher progressivity of the air spring force as the damper reaches full compression making it a positional sensitive damping mechanism.

Figure 4:
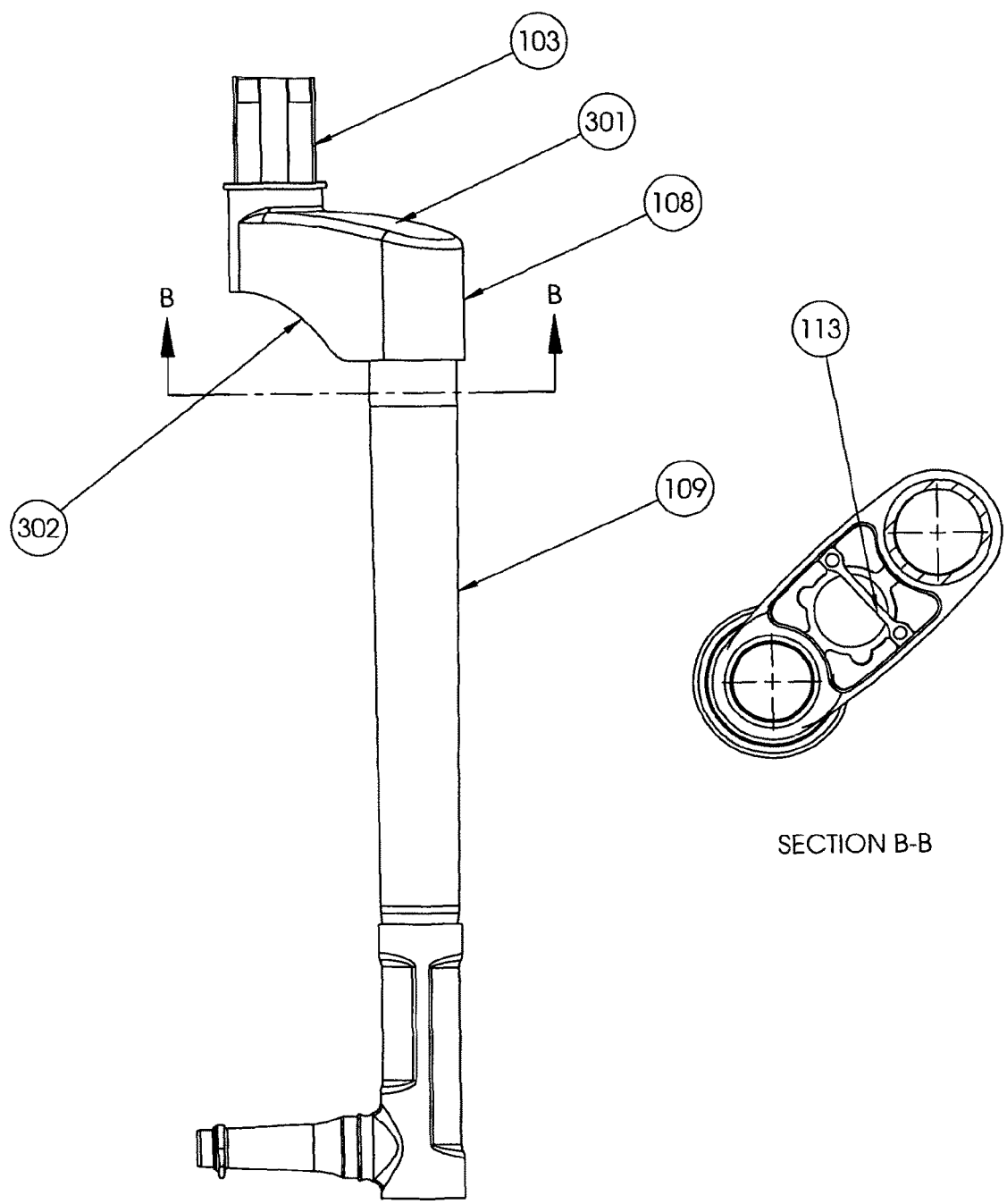
FIG. 4 shows the integration of the inner tube with the crown and leg as well as a view of the underside of the crown.

FIG. 4 shows the integration of the inner tube 103 with the crown 108 and leg 109 as well as a view of the underside of crown 108. To maintain steering rigidity and fork stiffness with only one leg, conventional designs could not be used. The crown 108 has been arched in 2 directions—side-to-side as depicted by 301, top-to-bottom as depicted by 302. The cross-arch design serves to provide front-to-back braking stiffness and the side arch provides torsional rigidity. Additionally, a thin member 113 located within crown 108 prevents the hollow inner portion of crown 108 from twisting.

Figure 5:
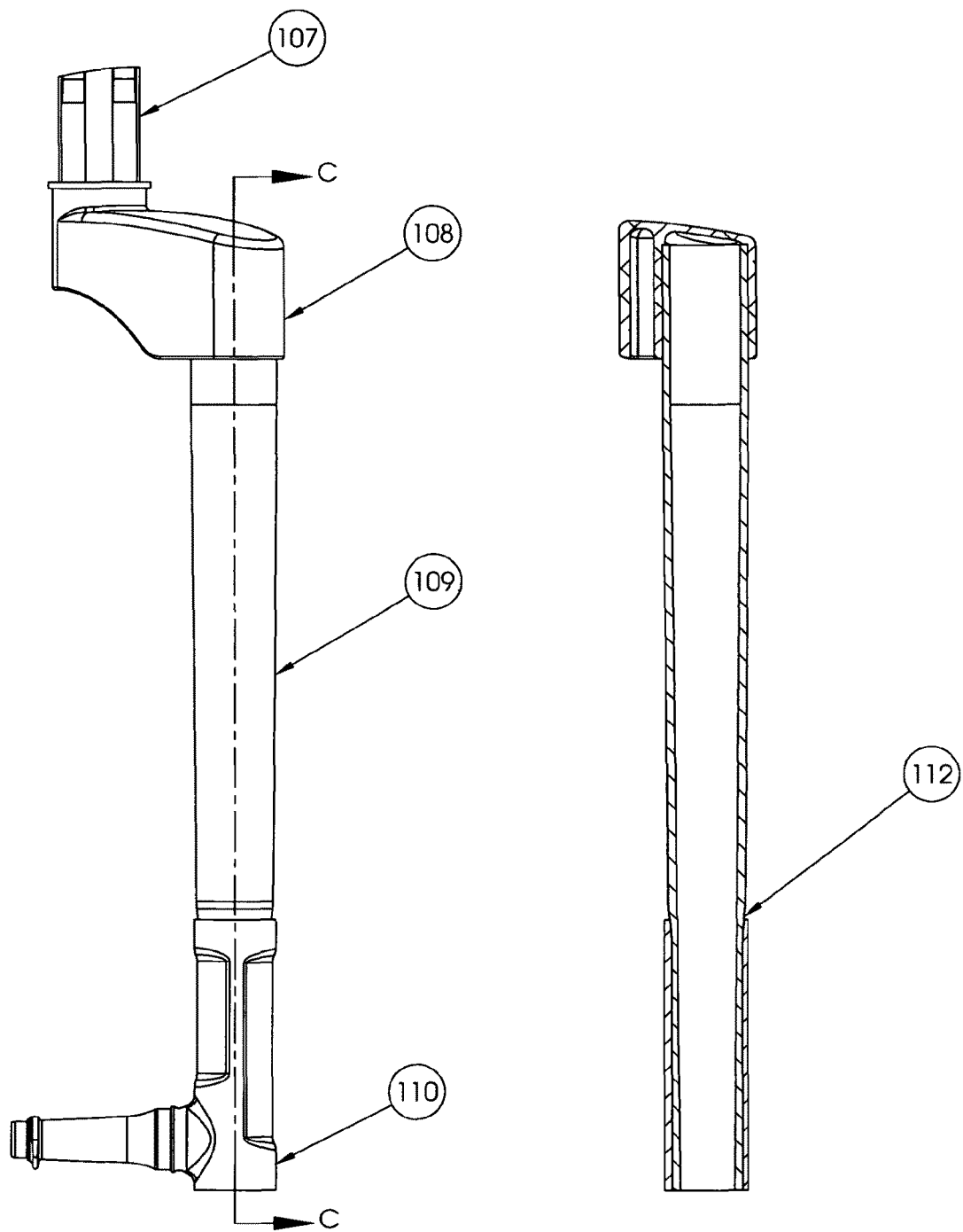
FIG. 5 shows a cross-sectional view of the leg, crown and wheel connector.

FIG. 5 shows a cross-sectional view of leg 109, crown 108 and wheel connector 110. Leg 109 has a tapered wall to provide strength at the lower end of the tube closest to the wheel.

In order to minimize weight and maintain a smooth profile transition from leg 109 to wheel connector 110, the wall thickness of wheel connector 110 is made extremely thin. The design increases the wall thickness of leg 109 at this point to maintain a constant wall. Leg 109 and wheel connector 110 are bonded as a metal on metal bond that has the desired strength. Of particular importance is a radial relief 112 as shown in wheel connector 110 and on leg 109. Such a radial relief 112 eliminates stress loading of the joint.

Figure 6:
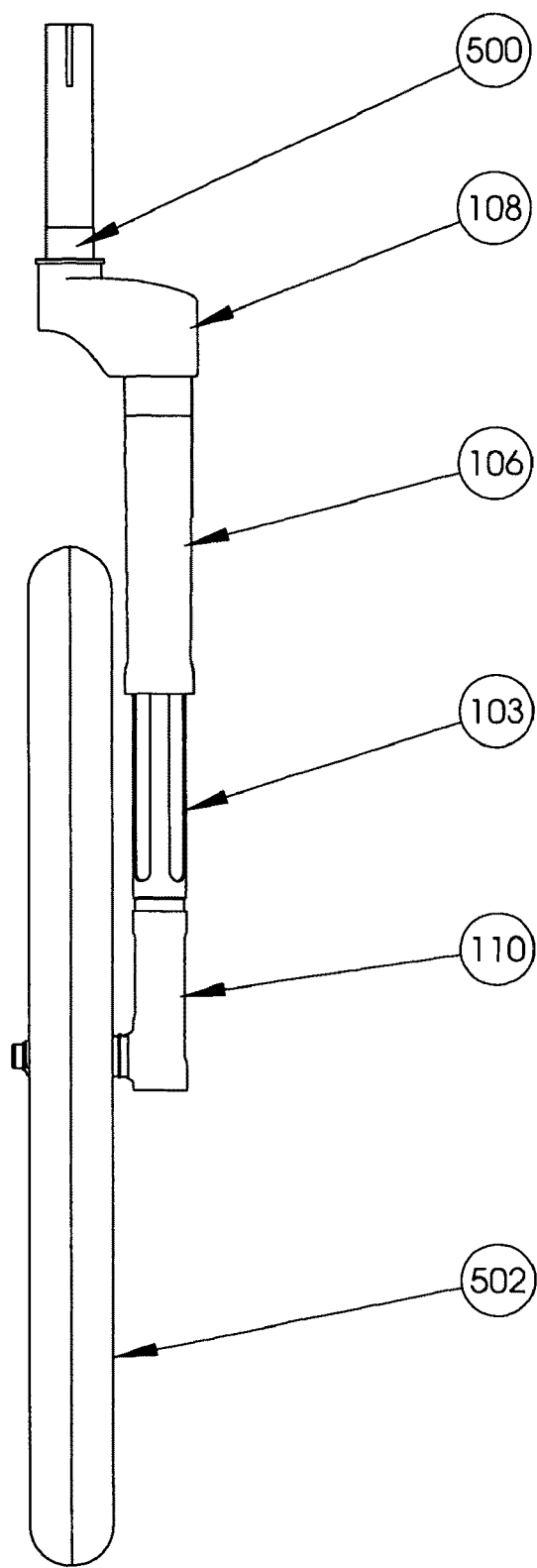
FIG. 6 shows an alternate embodiment of the invention with the telescoping member in the leg.

FIG. 6 shows an alternate embodiment of the bicycle suspension system with the inner and outer tube located in the leg of the fork. A steerer tube 500 is used to secure the fork to the handlebars of the bicycle. Inner tube 103 and outer tube 106 serve as the leg of the fork. Inner tube 103 telescopes within 106. Inner tube 103 is connected to wheel connector 110 for securing the leg to the wheel 502. Crown 108 attaches outer tube 106 to the steerer tube 500 to allow steering motion to translate into wheel motion.

Figure 7:
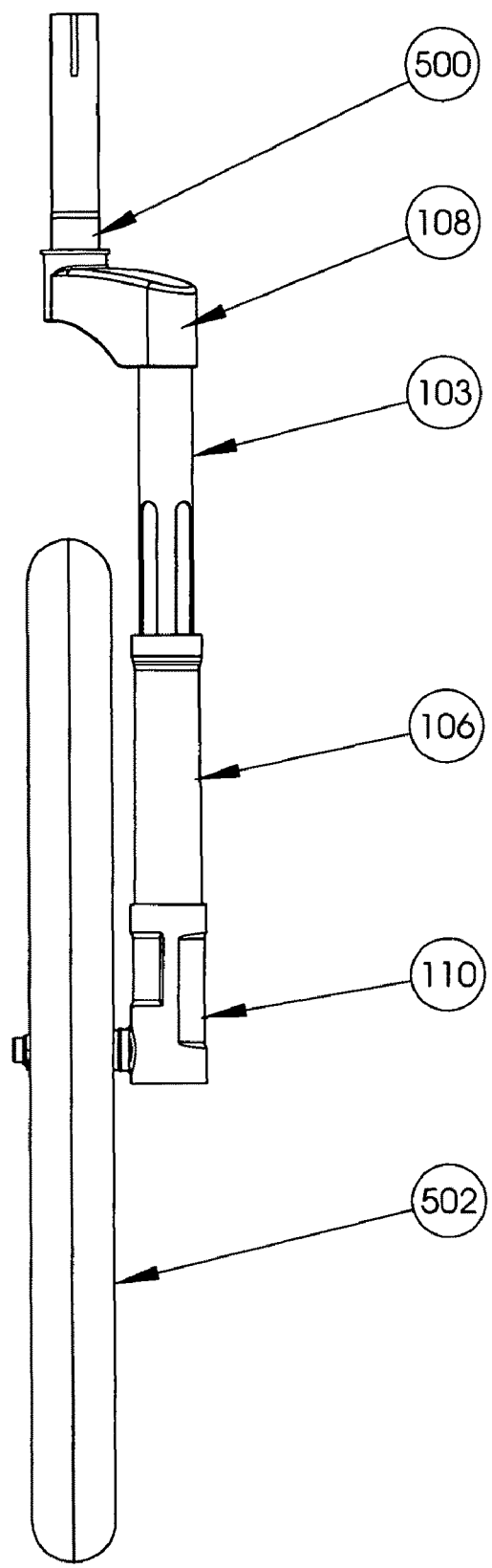
FIG. 7 shows yet another alternate embodiment of the invention with the telescoping member in the leg.

FIG. 7 shows yet another alternate embodiment of the bicycle suspension system with the inner and outer tube located in the leg of the fork. A steerer tube 500 is used to secure the fork to the handlebars of the bicycle. Inner tube 103 and outer tube 106 serve as the leg of the fork. Inner tube 103 telescopes within 106. Inner tube 103 is connected to crown member 108. Outer tube 106 is connected to wheel connector 110 for securing the leg to the wheel 502. Crown 108 attaches inner tube 103 to the steerer tube 500 to allow steering motion to translate into wheel motion.

Figure 8:
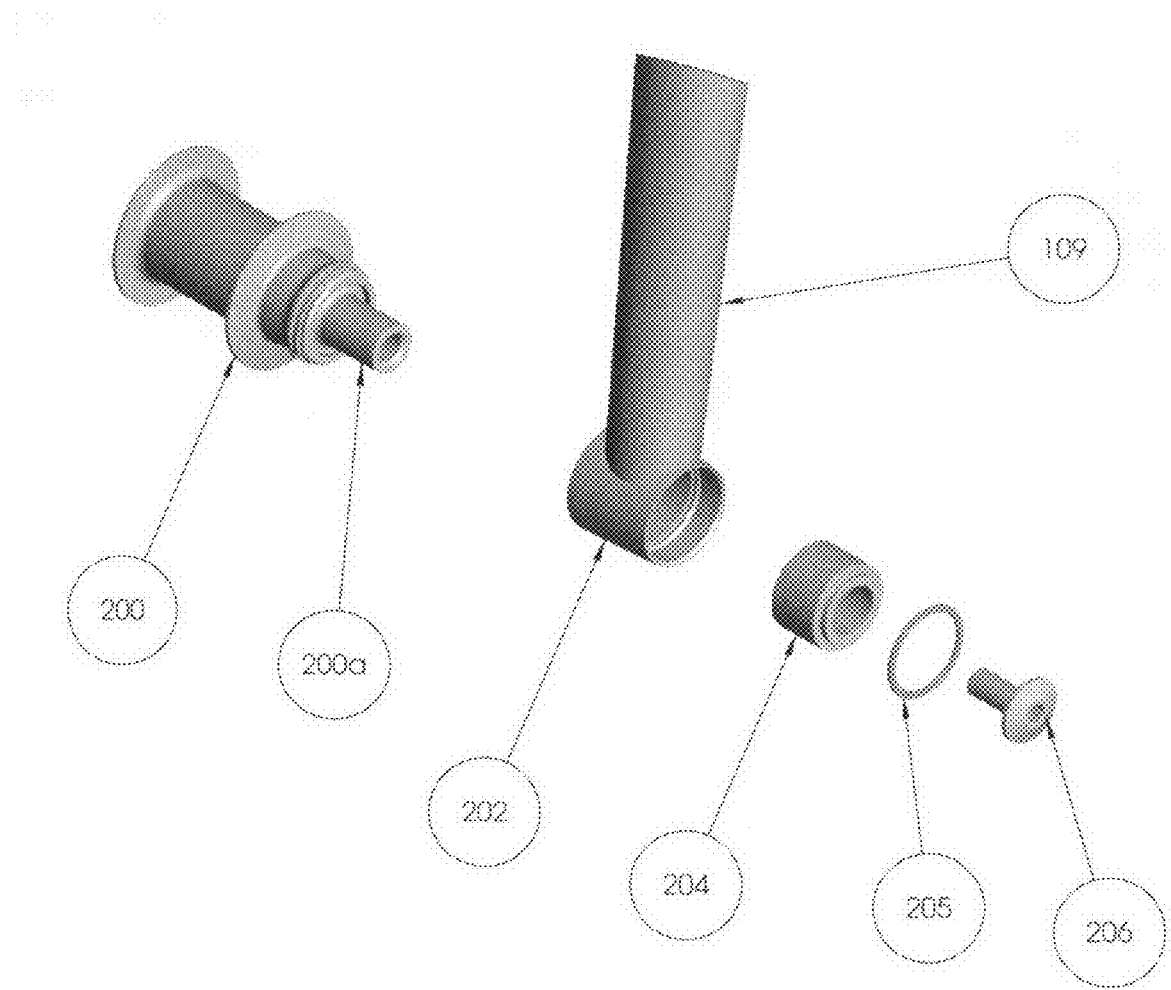
FIG. 8 shows an alternate embodiment of the wheel connection.

FIG. 8 shows an exploded view of an alternate embodiment of the leg and wheel connection. In this case the hub of the wheel 200 incorporates an axle extension 200a on one end of the hub. A cylinder 202 is attached to one end of the fork leg 109. A bearing 204 is pressed into cylinder 202 and retained by a bearing retaining ring 205. The axle is secured into the cylinder 202 and secured via bolt 206.

What is claimed is:

1. A bicycle suspension fork compromising:
   an inner and outer tube located in the head tube of the bicycle designed to telescope with respect to each other,
   a damping means located in the inner tube and connected to the outer tube
   a single sided fork crown serving as a connection means to connect the inner tube to the wheel of the bicycle,
   a single tube connected from the fork crown to the axle connection
   a single axle connection means coupling the tube to the axle of the wheel
   wherein the damping means divides the inner diameter of the inner tube into a minimum of three respective chambers a first and second oil chamber and a rebound air chamber.

2. A bicycle suspension fork compromising:
   an inner and outer tube located in the head tube of the bicycle designed to telescope with respect to each other,
   a damping means located in the inner tube and connected to the outer tube
   a single sided fork crown serving as a connection means to connect the inner tube to the wheel of the bicycle,
   a single tube connected from the fork crown to the axle connection
   a single axle connection means coupling the tube to the axle of the wheel
   wherein the damping means contains a floating piston located above an oil piston separated from said oil piston by oil, said floating piston moving in response to the position of the main shaft.

3. A bicycle suspension fork compromising:
   an inner and outer tube located in the head tube of the bicycle designed to telescope with respect to each other,
   a damping means located in the inner tube and connected to the outer tube
   a single sided fork crown serving as a connection means to connect the inner tube to the wheel of the bicycle,
   a single tube connected from the fork crown to the axle connection
   a single axle connection means coupling the tube to the axle of the wheel
   wherein the axle connection means has the same outside diameter as the tube connecting fork crown to the axle at their connection point and that the wall thickness of the fork tube has been increased at this point.

4. A bicycle suspension fork compromising:
   an inner and outer tube located in the head tube of the bicycle designed to telescope with respect to each other,
   a damping means located in the inner tube and connected to the outer tube
   a single sided fork crown serving as a connection means to connect the inner tube to the wheel of the bicycle,
   a single tube connected from the fork crown to the axle connection
   a single axle connection means coupling the tube to the axle of the wheel,
   wherein the axle connection means comprises a cylinder secured to the single tube designed to accept an axle, a wheel hub with an incorporated axle on one end, a ball bearing incorporated in the cylinder designed to accommodate the axle, and an attachment screw which secures said wheel hub to the cylinder.

5. A bicycle suspension fork compromising:
   a steerer tube located in the head tube of the bicycle designed to provide a connecting means between the handlebars and the fork crown,
   a single sided fork crown serving as a connection means to connect the steerer tube and the single-sided fork leg,
   a single inner and outer tube serving as a single-sided fork leg of the bicycle designed to telescope with respect to each other,
   a damping means located in the inner tube and connected to the outer tube,
   a single axle connection means coupling the single-sided fork leg to the axle of the wheel, wherein the damping means divides the inner diameter of the inner tube into a minimum of three respective chambers a first and second oil chamber and a rebound air chamber.

6. A bicycle suspension fork compromising:
a steerer tube located in the head tube of the bicycle designed to provide a connecting means between the handlebars and the fork crown,
a single sided fork crown serving as a connection means to connect the steerer tube and the single-sided fork leg,
a single inner and outer tube serving as a single-sided fork leg of the bicycle designed to telescope with respect to each other,
a damping means located in the inner tube and connected to the outer tube,
a single axle connection means coupling the single-sided fork leg to the axle of the wheel
wherein the damping means contains a floating piston located above an oil piston separated from said oil piston by oil, said floating piston moving in response to the position of the main shaft.

7. A bicycle suspension fork compromising:
a steerer tube located in the head tube of the bicycle designed to provide a connecting means between the handlebars and the fork crown,
a single sided fork crown serving as a connection means to connect the steerer tube and the single-sided fork leg,
a single inner and outer tube serving as a single-sided fork leg of the bicycle designed to telescope with respect to each other,
a damping means located in the inner tube and connected to the outer tube,
a single axle connection means coupling the single-sided fork leg to the axle of the wheel,
wherein the axle connection coupling has the same outside diameter as the fork leg at their connection point and that the wall thickness of the fork leg has been increased at this point.

8. A bicycle suspension fork compromising:
a steerer tube located in the head tube of the bicycle designed to provide a connecting means between the handlebars and the fork crown,
a single sided fork crown serving as a connection means to connect the steerer tube and the single-sided fork leg,
a single inner and outer tube serving as a single-sided fork leg of the bicycle designed to telescope with respect to each other,
a damping means located in the inner tube and connected to the outer tube,
a single axle connection means coupling the single-sided fork leg to the axle of the wheel
wherein the axle connection means comprises a cylinder secured to the single tube designed to accept an axle, a wheel hub with an incorporated axle on one end, a ball bearing incorporated in the cylinder designed to accommodate the axle, an attachment screw which secures said wheel hub to the cylinder.

* * * * *